T. COSBEY.
Wedges for Splitting Rock, &c.

No. 165,984. Patented July 27, 1875.

WITNESSES:
INVENTOR:
Thos. Cosbey
BY
ATTORNEYS.

UNITED STATES PATENT OFFICE.

THOMAS COSBEY, OF MORMON MILLS, TEXAS.

IMPROVEMENT IN WEDGES FOR SPLITTING ROCK, &c.

Specification forming part of Letters Patent No. 165,984, dated July 27, 1875; application filed April 24, 1875.

*To all whom it may concern:*

Be it known that I, THOMAS COSBEY, of Mormon Mills, Burnet county, Texas, have invented a new and Improved Wedge, of which the following is a specification:

My invention consists of a metal wedge, whereof the middle portion is hollow or open from one of the tapered sides to the other, to dispense with certain portions of the metal of a solid wedge which are not needed for the functions of the wedge, and thus economize in the cost; also to make it lighter and more convenient to handle; and also to provide a hole by which it can be grasped by the fingers or by hooks when it has fallen into a deep cleft of a log, rock, or other object from which it is very difficult to remove a solid wedge when slightly wedged in on account of the difficulty of taking hold of it.

Figure 1:
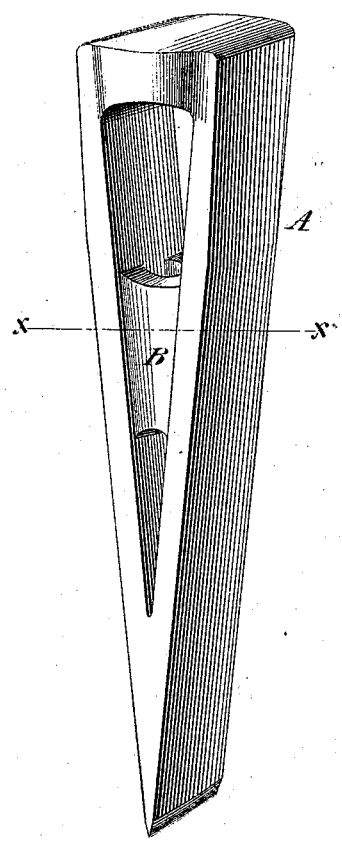
Figure 2:
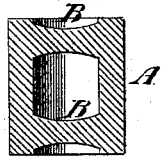

Figure 1 is a perspective view of a wedge constructed according to my invention, and Fig. 2 is a transverse section taken on the line $x\ x$, Fig. 1.

Similar letters of reference indicate corresponding parts.

A is a metal wedge of the ordinary form as to the exterior, but having a large opening through it from one tapered side to the other, and extending nearly from the head to the point, by which a material part of the metal commonly used is dispensed with without in any manner impairing the efficiency of the wedge, the said portion being entirely unnecessary, except, perhaps, one or more stays B, which may be necessary to prevent the sides from binding in when using the wedge for splitting down a rock or other severe work. The wedge may be forged out on a mandrel of the form corresponding to the shape of the opening, and the stays may be afterward welded in.

Having thus described my invention, I claim as new, and desire to secure by Letters Patent—

As an improved article of manufacture, a hollow or skeleton metal wedge, substantially as herein described.

THOMAS COSBEY.

Witnesses:
ISAAC MAC SHETTON,
THOMAS M. DEEDS.